US008633985B2

(12) United States Patent
Haynes et al.

(10) Patent No.: US 8,633,985 B2
(45) Date of Patent: Jan. 21, 2014

(54) COMPUTERIZED INFORMATION COLLECTION AND TRAINING METHOD AND APPARATUS

(75) Inventors: Ian Frederick Haynes, Brisbane (AU); Bradley Jason Schultz, Brisbane (AU); Stephen Conway Larkin, Brisbane (AU); Sean David Rogers, Brisbane (AU)

(73) Assignee: Vigil Systems Pty. Ltd., Queensland (AU)

(*) Notice: Subject to any disclaimer, the term of this patent is extended or adjusted under 35 U.S.C. 154(b) by 1175 days.

(21) Appl. No.: 11/989,954

(22) PCT Filed: Aug. 7, 2006

(86) PCT No.: PCT/AU2006/000118
§ 371 (c)(1),
(2), (4) Date: Feb. 4, 2008

(87) PCT Pub. No.: WO2007/016731
PCT Pub. Date: Feb. 15, 2007

(65) Prior Publication Data
US 2009/0262191 A1  Oct. 22, 2009
US 2010/0208070 A2  Aug. 19, 2010

(30) Foreign Application Priority Data
Aug. 5, 2005  (AU) ................ 2005904216
Oct. 19, 2005  (AU) ................ 2005905766

(51) Int. Cl.
*H04N 7/18* (2006.01)
*B60Q 1/00* (2006.01)

(52) U.S. Cl.
USPC ........................ 348/148; 340/438

(58) Field of Classification Search
USPC .......... 701/35, 29; 386/244; 704/9; 380/270; 702/188; 382/238; 348/148; 340/438
See application file for complete search history.

(56) References Cited

U.S. PATENT DOCUMENTS

| 5,353,023 | A * | 10/1994 | Mitsugi ................ 340/989 |
| 5,534,759 | A * | 7/1996 | Evans et al. ............ 318/139 |
| 5,539,645 | A * | 7/1996 | Mandhyan et al. ...... 701/119 |
| 5,928,291 | A * | 7/1999 | Jenkins et al. .......... 701/1 |
| 6,272,457 | B1* | 8/2001 | Ford et al. ............. 704/9 |
| 6,298,290 | B1* | 10/2001 | Abe et al. ............. 701/32.2 |
| 6,593,848 | B1* | 7/2003 | Atkins, III ............ 340/426.1 |

(Continued)

FOREIGN PATENT DOCUMENTS

| DE | 10343942 | 4/2005 |
| DE | 102004047865 | 4/2006 |

(Continued)

*Primary Examiner* — Firmin Backer
*Assistant Examiner* — Michael A Chambers
(74) *Attorney, Agent, or Firm* — Stein IP, LLC

(57) ABSTRACT

A method and apparatus for collecting information relating to a driver of a motor vehicle using portable computing apparatus, camera for capturing an image or images relating to operation of the vehicle by the driver and a location sensor for providing information relating to location of the vehicle. The computing apparatus is capable of recording information from an observer relating to operation of the vehicle by the driver to enable the driver to be assessed. The method and apparatus may be applied to capturing information relating to any observable scene. Information collected as above may be used for a training or an information program for drivers or users of vehicles.

22 Claims, 9 Drawing Sheets

(56) References Cited

U.S. PATENT DOCUMENTS

| | | | |
|---|---|---|---|
| 6,650,977 B2* | 11/2003 | Miller | 701/32.7 |
| 6,684,027 B1* | 1/2004 | Rosenberg | 386/244 |
| 6,711,535 B2* | 3/2004 | Ford et al. | 704/1 |
| 6,735,506 B2* | 5/2004 | Breed et al. | 701/36 |
| 6,784,973 B1* | 8/2004 | Wozniak et al. | 355/40 |
| 6,925,425 B2* | 8/2005 | Remboski et al. | 702/188 |
| 7,003,443 B2* | 2/2006 | Ford et al. | 704/9 |
| 7,129,848 B2* | 10/2006 | Milliot et al. | 340/628 |
| 7,483,485 B2* | 1/2009 | Winningstad et al. | 375/240.01 |
| 7,496,140 B2* | 2/2009 | Winningstad et al. | 375/240.01 |
| 7,548,961 B1* | 6/2009 | Fernandez et al. | 709/219 |
| 7,565,230 B2* | 7/2009 | Gardner et al. | 701/32.7 |
| 7,756,640 B2* | 7/2010 | Ueyama et al. | 701/417 |
| 8,139,878 B2* | 3/2012 | Abe et al. | 382/238 |
| 2001/0039489 A1* | 11/2001 | Ford et al. | 704/1 |
| 2001/0053970 A1* | 12/2001 | Ford et al. | 704/9 |
| 2002/0091473 A1* | 7/2002 | Gardner et al. | 701/35 |
| 2002/0116156 A1* | 8/2002 | Remboski et al. | 702/188 |
| 2003/0028296 A1* | 2/2003 | Miller | 701/29 |
| 2003/0069716 A1* | 4/2003 | Martinez | 702/188 |
| 2003/0105566 A1* | 6/2003 | Miller | 701/33 |
| 2003/0120522 A1* | 6/2003 | Uyeki | 705/5 |
| 2003/0132968 A1* | 7/2003 | Stewart et al. | 345/771 |
| 2003/0153329 A1* | 8/2003 | Stefan et al. | 455/456 |
| 2004/0054452 A1* | 3/2004 | Bjorkman | 701/29 |
| 2005/0171663 A1* | 8/2005 | Mittelsteadt et al. | 701/35 |
| 2006/0018642 A1* | 1/2006 | Chaplin | 396/7 |
| 2006/0044401 A1* | 3/2006 | Park | 348/207.99 |
| 2006/0055564 A1* | 3/2006 | Olsen et al. | 340/994 |
| 2006/0077095 A1* | 4/2006 | Tucker et al. | 342/357.08 |
| 2006/0106504 A1* | 5/2006 | Carpenter | 701/1 |
| 2006/0165160 A1* | 7/2006 | Winningstad et al. | 375/219 |
| 2006/0171539 A1* | 8/2006 | Winningstad et al. | 380/270 |
| 2006/0185019 A1* | 8/2006 | Wong | 726/26 |
| 2006/0212195 A1* | 9/2006 | Veith et al. | 701/35 |
| 2008/0103651 A1* | 5/2008 | Pillar et al. | 701/29 |
| 2009/0157619 A1* | 6/2009 | Oates et al. | 707/3 |

FOREIGN PATENT DOCUMENTS

| | | | |
|---|---|---|---|
| EP | 1447783 | 8/2004 | |
| FR | 2667962 A1 * | 4/1992 | G01M 17/00 |
| JP | 08-339160 | 12/1996 | |
| JP | 2004-258900 | 9/2004 | |
| JP | 2005-316004 | 11/2005 | |
| WO | WO2006/016295 | 2/2006 | |
| WO | WO2006/034571 | 4/2006 | |
| WO | WO 2007016731 A1 * | 2/2007 | |

* cited by examiner

Driving Assessment vigil

NAME: _____
DATE: _____

FOLLOWING DISTANCE
- [1] USES PROPER STOPPING DISTANCE BEHIND OTHER VEHICLES
- [0] MAINTAINS SAFE FOLLOWING DISTANCE AT CITY DRIVING SPEEDS
- [0] PROPER FOLLOWING DISTANCE AT FREEWAY DRIVING SPEEDS

TURNS
- [0] PROPERLY POSITIONS BUS PRIOR TO TURN
- [0] SCANS MIRRORS FOR FIXED OBJECTS AND OBSTRUCTIONS
- [1] PROPER TURNING SPEED OF 10 MILES OR LESS
- [0] USES HAND-OVER-HAND OR PUSH-PULL TECHNIQUE

TRAFFIC LIGHTS AND SIGNS
- [■] OBEYS TRAFFIC LIGHTS AND ROAD SIGNS
- [0] PROPERLY STOPS BEHIND CROSSWALK OR LIMIT LINE AT INTERSECTION
- [0] ACCELERATES SMOOTHLY WHEN DEPARTING TRAFFIC LIGHTS OR SIGNS

INTERSECTIONS
- [0] COVERS BRAKE BEFORE ENTERING INTERSECTION
- [0] SCANS FOR VEHICLE ENTERING INTERSECTION, AND PEDESTRIANS
- [0] TAPS HORN FOR COMMUNICATION WHEN NECESSARY.

BRAKING
- [0] CORRECT FOOT PLACEMENT ON BRAKE PEDAL DURING BRAKE APPLICATION
- [2] APPLIES A SMOOTH BRAKE APPLICATION TO BRING THE BUS TO A COMPLETE STOP
- [0] PLACES FOOT OVER BRAKE AND REDUCES SPEED WHEN APPROACHING HAZARD

SPEED
- [1] OBEYS SPEED LIMIT LAWS
- [1] OPERATES BUS UNDER CONTROL AND SAFELY
- [0] REDUCES SPEED AND COVERS BRAKE WHEN APPROACHING HAZARDS
- [0] ACCELERATES SMOOTHLY WHEN DEPARTING BUS ZONES

RECORDING | PAUSE | STOP | EXIT

FIG. 2

Vigil Systems Driver Assessment Report

- PARTICIPANT
- VEHICLE TYPE
- DATE OF ASSESSMENT
- ASSESSOR:

| TRAVELLING SPEED RANGE | 0-30KMH | 30-50KMH | 50-70KMH | 70+KMH |
|---|---|---|---|---|
| PERCENTAGE OF TRIP | 50 | 32 | 6 | 12 |

FOLLOWING DISTANCE
INTERSECTION
BRAKING
TURNS
SPEED
TRAFFIC LIGHTS/SIGNS

FOLLOWING DISTANCE

| FOLLOWING DISTANCE AT FREEWAY SPEEDS | 2 | FOLLOWING TOO CLOSE WILL NOT ALLOW ENOUGH TIME TO REACT IF A VEHICLE SUDDENLY SLOWS OR STOPS | OPERATORS MUST HAVE THE BUS UNDER CONTROL AND BE ABLE TO STOP SMOOTHLY AND SAFELY IF THE VEHICLE... |

COMPUTERIZED INFORMATION COLLECTION AND TRAINING METHOD AND APPARATUS

TECHNICAL FIELD

This invention relates to a computerised information collection method and apparatus and a method of, and apparatus for, training based on the information collected. The present invention is particularly but not exclusively suited to use in collecting information on drivers operating vehicles for assessment of drivers undertaking a driver training or testing program. The present invention is also particularly but not exclusively suited to the training of or informing drivers or users of motor vehicles. The method and apparatus of the invention however may be used for the purposes of information collection and/or training in a wide range of applications.

BACKGROUND ART

Driver error accounts for more than 90% of all road traffic collisions. Most accidents are not caused by unsafe cars or dangerous roads but by drivers making mistakes. Identifying, managing and correcting unsafe driving behavior is crucial to reducing the costs and risks associated with accidents. Passenger transport organizations worldwide are acing similar challenges in managing the risk profile of their drivers. There are significant costs associated with accidents and incidents, including insurance, liability claims, vehicle and property damage, injuries and fatalities.

In our U.S. Pat. No. 6,470,240, we disclose a driver training system to improve the safety and competency of drivers. In that system, a portable sensing unit is temporarily mounted into a vehicle to measure and record driver behaviour during an on-road training session. Measurement and recording of the driver's behaviour however is simply by means of the sensing unit with no input from a third party such as a driver instructor or tester.

Currently, several in-vehicle technologies are available to intervene when hazardous driving is detected. Antilock Braking Systems (ABS), Electronic Stability Programs (ESP), Collision avoidance systems (CAS), Lane Departure Warning systems and Adaptive Cruise Control systems are all advanced 'last-minute' intervention technologies that have the ability to reduce the incidence of injury during the vital seconds before a crash. These technologies are predominantly found in passenger cars, as opposed to large commercial vehicles, such as buses. These intervention technologies do not allow the managers of professional transit drivers to intervene as the likelihood of crash or other incident increases nor do they provide information relating to correct operation of a motor vehicle. Larger vehicles such as buses may have "black box" technologies installed to record data however these provide date only after an event has occurred.

In order to ensure safety and service standards are maintained at all times, transport operators seek an effective approach to monitor and assess drivers during service hours as well as during training and licensing processes. These assessments may include assessments of driving skill, conduct or business to organizational standards, passenger interaction, driving to road rules and other driving aspects. Ensuring the safety of passengers and other road users is a primary objective for transport operators.

It would be desirable for an onboard instructor or tester to be able to collect information whilst observing a vehicle driver during operation of a vehicle and provide advanced input upon which a subsequent driver assessment report can be based so as to provide an enhanced training facility for vehicle drivers.

Inspection of other non-driving procedures or processes to ensure for example correct and efficient operation of those procedures or processes is usually undertaken manually by trained personnel using basic recording equipment which may be as simple as a form or pad upon which information is written. Similarly, manual inspections of factories, warehouses or other establishments are generally undertaken as part of an auditing program using basic recording equipment as above. It would be desirable to provide a means whereby information relating to such procedures, processes or establishments could be more efficiently recorded to provide an enhanced means for assessment of such procedures, processes or establishments or persons involved in such procedures, processes or establishments.

It would also desirable to be able to train vehicle operators as to particular geographical routes that the vehicle controlled by the operator is required to travel and to train the operator to recognize certain locations along that route. Potential training applications include bus driver routes and other application where training must be delivered related to an accurate geographical location or route such as homeland security applications, rail and light rail applications, dangerous goods transport applications, oil and gas transport applications, mining vehicle applications, airport flightside applications, marine and military applications.

It would also be desirable to enable information to be collected on operation of other machinery or equipment to enables assessment thereof to ensure machinery or other equipment is operated by operators in an efficient, correct or safe manner or to ensure trainee operators are trained correctly in the operation of such machinery and equipment.

SUMMARY OF THE INVENTION

The present invention thus aims to provide in one aspect a computerised information collection method and apparatus which are particularly but not exclusively suited to use in collecting information on operators of machinery or equipment or individuals undertaking other observable tasks for the purposes of assessing the operation of the machinery or equipment. In a particular aspect, the present invention aims to provide a method and apparatus for collecting information on operation of vehicles by drivers of vehicles to enable assessment of drivers undertaking a driver training or testing program. In a further aspect, the present invention aims to provide a method and apparatus for collecting information of other observable scenes such as for collecting information on certain processes or establishments for auditing or inspection purposes. In yet another aspect, the present invention aims to provide a training method and apparatus for vehicle operators and in particular to a route training method and apparatus. The present invention further aims to provide a method and apparatus for preparing a computer-based route training program using the above referred to information collection method and apparatus. Other objects and advantages of the invention will become apparent from the following description.

The present invention thus provides in a first preferred aspect, a method of collecting information relating to an observable scene comprising the steps of capturing and recording in computing apparatus, image data relating to said scene, recording in said computer apparatus, location data corresponding to said image data, said location data being synchronised with said recorded image data, and providing in said computing apparatus, means for recording information relating to said recorded image and/or location data.

The present invention in further aspect provides apparatus for collecting information relating to an observable scene, said apparatus including computing apparatus, image capturing means for capturing an image or images of said scene, means for recording in said computing apparatus, image data capturing by said image capturing means, location sensing means, means for recording in said computing apparatus, location data sensed by said location sensing means, said location data being synchronized with said recorded image data, and input means for recording in said computing apparatus, information relating to said image data and/or said location data.

The computing apparatus may comprise a portable computer such as a tablet PC, a pocket or palm PC or laptop computer. Alternatively the computing apparatus may, depending upon the application, comprise a fixed computer or an onboard computer on a vehicle from which images are captured and recorded. Preferably the imaging capturing means, location sensing means and computing means are located in a vehicle from which the image and location data are captured and recorded.

The apparatus may additionally include one or more sensors for sensing further data and means are suitably provided for recording the further data in the computing apparatus at the same time as recording of the image and/or location data.

The computing apparatus may comprise a single computer for the recording of all data including the image and location data. Alternatively the computing apparatus may include first computer means for recording the image and location data or any other data and a second computer means comprising the input means for recording the information relating to the image and for location data.

The first computer means may comprise a tablet PC, a PDA (pocket or palm PC), a laptop computer, an in-vehicle PC, a desktop PC, a cell phone, a customized embedded computer or any other computing device.

The second computer means may comprise a tablet PC, a PDA (pocket or palm PC), a cell phone, smart paper, a laptop computer or other computing platform. The interface to the input means may comprise one or more of a stylus, touch screen, mouse, trackball, smart pen for use with smart paper, keyboard, keypad, microphone associated with voice recognition software, a game pad or a joystick.

The computer means or apparatus for recording information relating to the image data and/or location data may display a table or form into which information may be inserted using an interface as referred to above and stored.

The image data may be video or still image data captured using any form of camera, a web cam, a separately recorded camcorder video, a PDA camera, time and/or location stamped still camera, or cell phone camera.

The location data may be data derived from any positioning system such as GPS, European Satellite Navigation System (GALILEO), Russian Global Navigation Satellite System (GLONASS), radio beacon based location technologies (802.11, Bluetooth, GSM), micro-location sensors or from an RF ID tag.

The information recorded and derived as above may be stored in single or multiple files from which particular information can be extracted to permit assessment of the stored information. In the case where a person undertaking a particular task is being monitored using the apparatus and method of the invention, the stored information can be extracted to determine whether that person is undertaking the task correctly or efficiently which enables corrective or counseling actions to be formulated if required. The information can be extracted by any standard database and reporting tools. Custom algorithms may be used to extract further information from the data not available using standard databases or reporting tools. Algorithms can be used to detect certain patterns which may require correction. The recorded data may also be subject to statistical analysis for any purposes.

In a particular aspect of the invention relating to motor vehicle drivers, the present invention provides a method of assessing a driver of a motor vehicle during operation of said vehicle by said driver, said method comprising the steps of monitoring and recording in computing apparatus, image data and location data relating to operation of said vehicle by said driver, said location data being synchronized with said image data, recording in said computing apparatus, input data from an observer during and relating to operation of said vehicle by said driver.

Preferably the computing apparatus is capable of analyzing the recorded data and providing a report or reports of operation of the vehicle by the driver based on the recorded data.

The present invention in another aspect provides apparatus for assessing a driver of a motor vehicle during operation of said vehicle by said driver, said apparatus comprising computing apparatus, image capturing means for capturing image data relating to operation of said vehicle by said driver, location sensing means for obtaining location data of said vehicle, said computing apparatus being adapted to store said image data and location data synchronized with said image data, and input means associated with said computing apparatus for input of data from an observer during and relating to operation of said vehicle by said driver.

Preferably the computing apparatus includes means for analyzing the data and for providing one or more reports relating to operation of the vehicle by said driver based on the data.

The image data most preferably includes captured image data as recorded for example by one or more video cameras showing a particular vehicle route traveled by a vehicle and/or the vehicle operator. The location data typically may be derived from a GPS sensor used to sense geographical location of the vehicle.

The apparatus may also include means for monitoring and recorded in the computing apparatus further data relating to operational parameters of a vehicle. The monitored vehicle parameters may comprise one or more of the following:

Pattern Recognition (position of the vehicle on a road or within a lane on a road).
Object Tracking (distance to other vehicles).
Vehicle inertia (to measure vehicle acceleration, deceleration and vehicle body movement such as in cornering and stopping).
Accelerator use.
Brake use.
Indicator use.
Engine RPM.
Fuel use.
Driver face/eye movement.

Preferably the input data provided by the observer is input under predetermined categories into the computing apparatus, the predetermined categories relating to the vehicle operation and/or the vehicle driver. Preferably the predetermined categories can be selectively displayed on the computing apparatus to enable input by the observer under a predetermined category or categories. Preferably the categories are displayed on a form or table, which can receive input from the observer under one or more of the categories. Typically the observer is a driver trainer or tester or other person skilled or expert in driving. The input means may comprise any known input device associated with the computing platform being used. For example the input may be input provided by a stylus in the case of a tablet or pocket PC or a mouse in the case of a laptop PC. The input may be a simple logic type answer such as a YES/NO answer. The form or table may include a default answer which may be accepted by or changed by the trainer or tester.

The input data provided by the trainer or tester is recorded with the image and location data suitably in a database and analysis of that data by the computing apparatus provides information on operation of the vehicle operation which may produce a report or reports relating to vehicle operation.

Whilst the method and apparatus of the invention as described above are typically applicable to driver training and testing, they may be applied to the operation of other machinery or equipment and thus reference to monitored parameters include where relevant reference to monitored parameters of machinery or equipment.

The present invention thus provides in a further preferred aspect, a method of assessing an operator of machinery or equipment during operation of said machinery or equipment by said operator, said method comprising the steps of monitoring and recording in computing apparatus, image data and location data synchronized with said image data relating to operation of said machinery or equipment by said operator, recording in said computing apparatus, input data from an observer during and relating to operation of said machinery or equipment by said operator, and analyzing said data and providing a report or reports of operation of said machinery or equipment by said operator based on said analysed data.

The present invention in yet another aspect provides apparatus for assessing an operator of a machinery or equipment, said apparatus comprising computing apparatus, image capturing means for capturing image data relating to operation of said machinery or equipment by said operator, location sensing means for obtaining location data relating to operation of said machinery or equipment by said operator, said computing apparatus being adapted to record said image data and location data synchronized with said image data and input means associated with said computing apparatus for receiving input data from an observer during and relating to operation of said machinery or equipment by said operator.

Preferably the computing apparatus includes means for analyzing the data and for providing one or more reports relating to operation of said machinery or equipment by the operator based on the data. Analyzing of the data and providing of the reports is suitably undertaken by using suitable software.

The reference to an observer above includes an instructor or expert in the operation of a vehicle or machinery or other equipment.

The present invention in another preferred aspect provides a method of collecting information on a procedure, process or establishment, said method comprising the steps of recording in computing apparatus image data and location data synchronized with said image data relating to said procedure, process or establishment and recording in said computing apparatus, input data from an observer relating to said procedure, process or establishment The present invention in yet a further aspect provides apparatus for collecting information on a procedure, process or establishment, said apparatus comprising computing apparatus, image capturing means for capturing image data relating to said procedure, process or establishment, locating sensing means for obtaining location data relating to said procedure, process or establishment, said computing apparatus being adapted to store said image data and location data synchronized with said image data relating to said procedure, process or establishment and input means for receiving input of data from an observer relating to said procedure, process or establishment.

The present invention provides in another preferred aspect, a method of preparing a computer-base route training program for vehicle operators comprising the steps of selecting a route in relation to which training is to be undertaken, recording and storing in computing apparatus video image data and location information data about said selected route, and compiling a computer-based training program based on said recorded and stored data.

Typically the image data and location data are recorded on image capturing means and location sensing means on a vehicle traveling along said route. Preferably the method also includes the step of recording further input data from an observer or trainer relating to the selected route, the further data being used in the training program.

The present invention provides in another preferred aspect, apparatus for preparing a computer-base route training or identification program in relation to a route to be undertaken by a vehicle operator, said apparatus comprising computing apparatus, image capturing means for capturing image data relating to said route, location sensing means for obtaining location data relating to said route, said computing apparatus being adapted to store said image data and location data, and input means associated with said computing apparatus for receiving input of data from an observer relating to said route to enable compiling of a computer-based training program based on said data.

Preferably the computer-based training or identification program is prepared at a fixed location and using appropriate authoring tools after recording of the above referred to data.

The image data and location data may be recorded using any vehicle, a laptop computer, and recording hardware. The recording hardware can be attached to any vehicle of any type (including bicycles and motorcycles). Typically the location recording hardware fits in a briefcase and will function anywhere location information data can be ascertained for example from a satellite, a global positioning system (GPS), from radio location, a track sector or speed transponder or from any other deployed location mechanism or system.

The image capturing means suitably comprises one or more cameras but preferably a plurality of video cameras. Most preferably four video cameras mounted to the vehicle for capturing video image data providing different images or perspectives of the route. Recording software associated with the hardware allows the operator to focus on capturing the highest quality information concerning the route. The computer based training or identification program may also be prepared using other data relating to the vehicle such as data derived from vehicle sensors such as engine interfaces, following distance sensors and inertial sensors. This data may also be recorded and stored for use in preparation of the training or identification program.

Preferably the video image data from the video cameras is synchronized with location, speed and other sensed and recorded data. The aforesaid data may be synchronized and multiplexed into the audio stream of Windows media files using real time multiplexing and compression algorithms. This information can then be de-multiplexed into vehicle information data, and audio, video and location information to be displayed to a trainee. Alternatively, multiple files for video and other data may be employed using time-based synchronization.

The training program of the invention can be used for training tasks focused on routes to be traversed as well as locations to be visited, for example transit bus routes and pick-up/delivery locations, mining haul roads, parcel delivery routes and pick-up/delivery locations, fuel delivery routes and drop off locations and military patrols routes and locations.

Trainers or authors of the program can integrate their own existing training materials into the training program including slideshows, animations, video, narrations and written documents.

The training or identification program may have the capability of presenting multiple windows including video images, mapping, other computer-based training content (macromedia flash animations, video etc) and text.

Points of interest along a particular route can be inserted by a trainer or author using the input means and may be classified for example as "Customer Service Issues", "Operator Issues" or "Safety Issues", and the trainer/author can define these issues in the context of the route. These points of interest may be linked to a timeline and a geographical location along the route and linked to specific frames or sections of video.

The use of a route database allows trainers/authors to define many routes typically hundreds of routes, and update them as routes change or as other issues with the routes become evident. Route changes can then be tracked using route modification history.

Using standard computer based training authoring tools; HTML quizzes can be embedded in the training program. Links can also be provided to other program materials. Subtitles and voice-over support can additionally be added to the program to allow the trainer/author to provide a running commentary to the route. The resultant program can be published into a single deployable file. A trainee or other person using the program is able to navigate vehicle information data, audio, video and information location in synchronization by navigating in time, space (maps) or by, specific events. Information "kiosk-style" navigation means that trainees or other persons with no previous computer experience can view the route information Navigation buttons may be provided to allow trainees or Other persons to work through the route at their own pace, absorbing as much information as possible. Each point of interest along the route is linked to the training materials inserted and authored by the trainer/author.

Trainees can be tested at any time during use of the program before being allowed to progress to the next phase of training.

Detailed aerial photography or satellite imagery and the video camera views help to orientate trainees in the route environment.

Points of interest highlighted by driver trainers ensure that trainees concentrate on significant parts of the route, and do not waste time on learning about irrelevant parts of a journey.

Whilst the program of the invention is particularly suited to use by persons undergoing a driver training program in relation to a particular route to be undertaken, it may also be used by other persons wishing to obtain information about a particular route to be undertaken. Whilst the program is usually undertaken at a fixed location remote from a vehicle, the program may also be used within a vehicle by a driver seeking information about a route.

In another aspect of the invention, each recorded route may be broken up into individual route segments with each segment comprising part of the route in relation to which training is to be undertaken and containing relevant video images and location information relating to that route segment. Each route segment also may contain "hotspot" and/or "hotzone" information. Each route segment is stored in a database as a separate file. Thus should a change occur in a portion of a route, the route segment of that route portion can be updated and re-recorded rather than requiring re-recording of the entire mute. To view a required route, the appropriate route segments which constitute that route can be played back in the correct order. Furthermore where different routes have some overlap, overlapping route segments are only required to be recorded once. Thus video image information, location data information and "hotspot" and "hotzone" information could be captured and recorded in database in separate route segment files of all roads in a country.

A user may then in seeking driving directions for a particular route search the database and receive information and directions relating to the particular route assembled from a plurality of route segment files which make up that route, the route being presented as video images, location data (as indicated on a map) and where relevant "hotspot" or "hotzone" information.

Whilst the route training program is capable of being played back through a software programmed computing platform, it may be streamed through a web-based viewing/learning tool so as to be accessible to persons requiring information on a particular route as well as to trainee drivers.

The present invention provides in another preferred aspect, a method of training or informing a vehicle operator or user in relation to a route to be undertaken, said method comprising the steps of providing to said vehicle operator or user, a computer-base route training program, said program being adapted to display information concerning said route including location information relating to said route to be undertaken and video images of said route corresponding to said location information.

Preferably the location information comprises information presented on a map.

The present invention provides in yet another preferred aspect, a computer based route training or information program for training or informing a vehicle operator or user in relation to a route to be undertaken, said program being adapted to display on a computer display screen information concerning said route including location information relating to said route to be undertaken and video images of said route corresponding to said location information. Preferably the location information is displayed on a map of said route or part of said route.

Preferably the displayed route includes a number of points of interest designated as "hotspots" or "hotzones" along the route. The points of interest may be designated in any manner for example as a number or cross on a particular route. Preferably information corresponding to respective points of interest along the route is accessible and displayable to the vehicle operator or user. That information may be displayed for example by positioning a cursor on the point of interest. The cursor may be positioned with a computer mouse or other positioning device and the information may be displayed by depressing a button on the mouse. That information may be a particular property relating to that point of interest for example road conditions at that marked location or any other information to be noted by the vehicle operator/trainee.

Where used in a training application, for example for training trainee drivers in relation to a route to be undertaken, means may be provided for tracking and recording routes or route segments viewed by a particular trainee. Such means which may comprise a software/web based tool may also advise of changes to a route or route segment and notify trainees or other persons of the changes or track trainees or other persons who know about the changes. A record may also be, maintained of which trainees or other persons may need to be advised of the changed route. Thus if a route or route segment is updated or changed, drivers are notified to re-learn changed routes or route segments. Drivers additionally may be prevented from traveling along a route unless they have viewed the updated route information.

The present invention thus provides in a further preferred aspect, means for monitoring the above route training program, said monitoring means including means for recording information on each said operator or user, and means for recording in relation to each said operator or user, route segments in relation to which training has been undertaken by said operator or user.

Preferably the monitoring means includes means for notifying operators or users of changes in route segments. The monitoring means suitably includes a database for recording the relevant information.

The stored information concerning route information, changes in route or route segment and drivers who have undertaken training in relation to a route or an updated route may be linked to an organization learning management system, human resource database and an advance transportation management system.

BRIEF DESCRIPTION OF THE DRAWINGS

In order that the invention may be more readily understood and put into practical effect, reference will now be made to the accompanying drawings which illustrate preferred embodiments of the invention described in relation to vehicle driver training or testing. The method and apparatus of the invention however may be used in many applications as referred to above other than that described in the embodiment set out below. In the drawings:—

FIG. 2 illustrates a typical driver assessment form as displayed on a display screen of the apparatus of the invention;

FIG. 4 illustrates typical driver assessment report generated by the apparatus of the invention;

DETAILED DESCRIPTION OF THE PREFERRED EMBODIMENT

Figure 1:
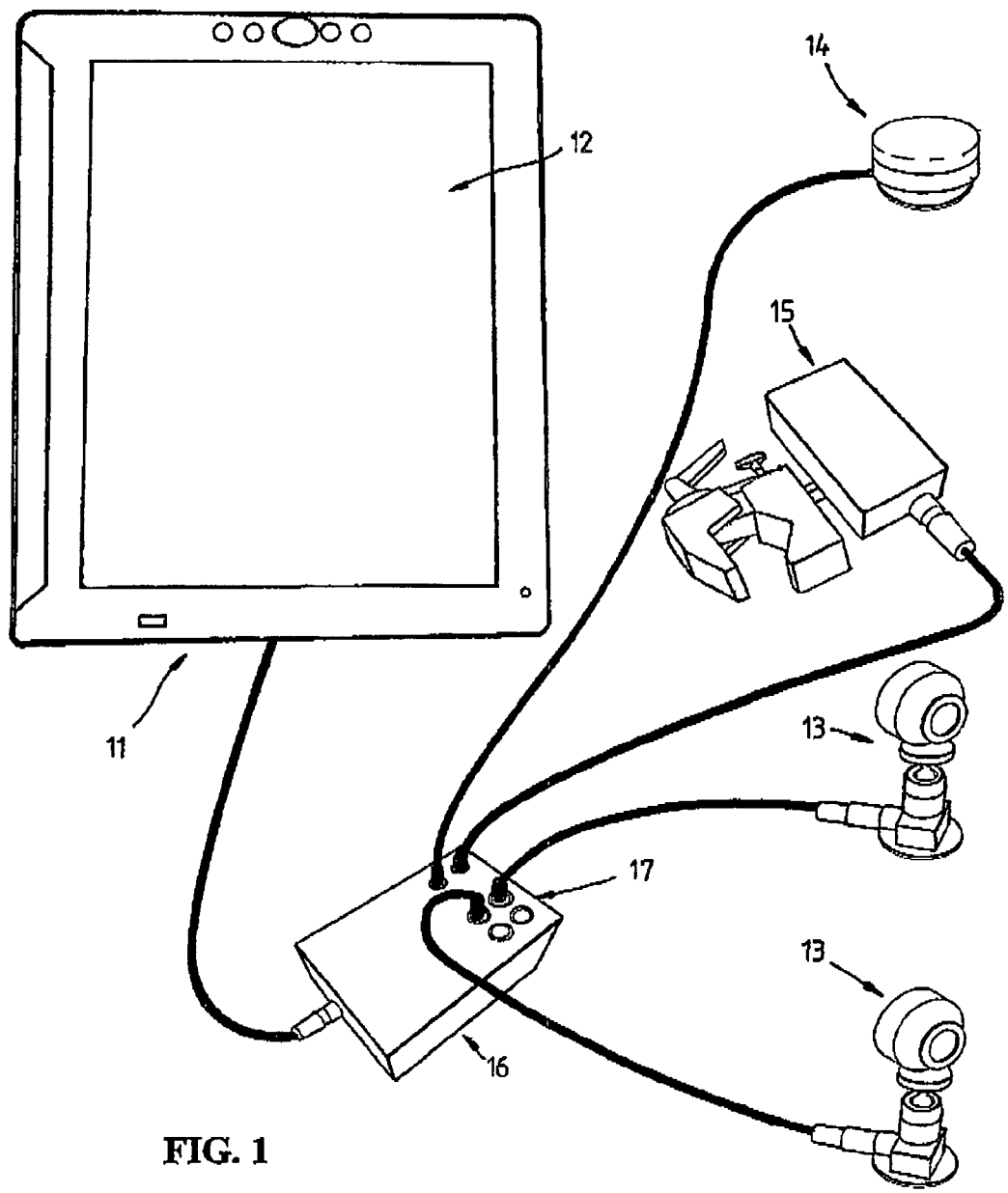
FIG. 1 illustrates typical components of information collection apparatus as used in the present invention for collecting information relating to assessment of a vehicle driver when operating a vehicle.

Referring to the drawings and firstly to FIG. 1, there is illustrated apparatus 10 according to an embodiment of the present invention for collecting information relating to a driver of a vehicle for subsequent assessment of a driver, the apparatus 10 including a tablet computer 11 having a display screen 12, one or more video cameras 13, a GPS sensor 14 for sensing speed and location, a comfort sensor 15, and a junction box 16 which has inputs 17 to receive up to four outputs from up to four cameras 13, and the outputs from a GPS sensor 14 and comfort sensor 15 and an output 18 which is connectable to the tablet computer 11. The computer 11 has any known input device such as a stylus or mouse. In a simplified version, the junction box 16 may have only three inputs for connection to two cameras 13 and a UPS sensor 14. In some applications however, the junction box 16 is not required as the sensors 14 and 15 and camera/s 13 may be connected directly to the computer 11. The comfort sensor 15 typically comprises an inertial sensor or other sensors to sense movements of the vehicle. Data from this or these sensors can be processed to determine the comfort level of the driver undertaking the drive.

Figure 3:
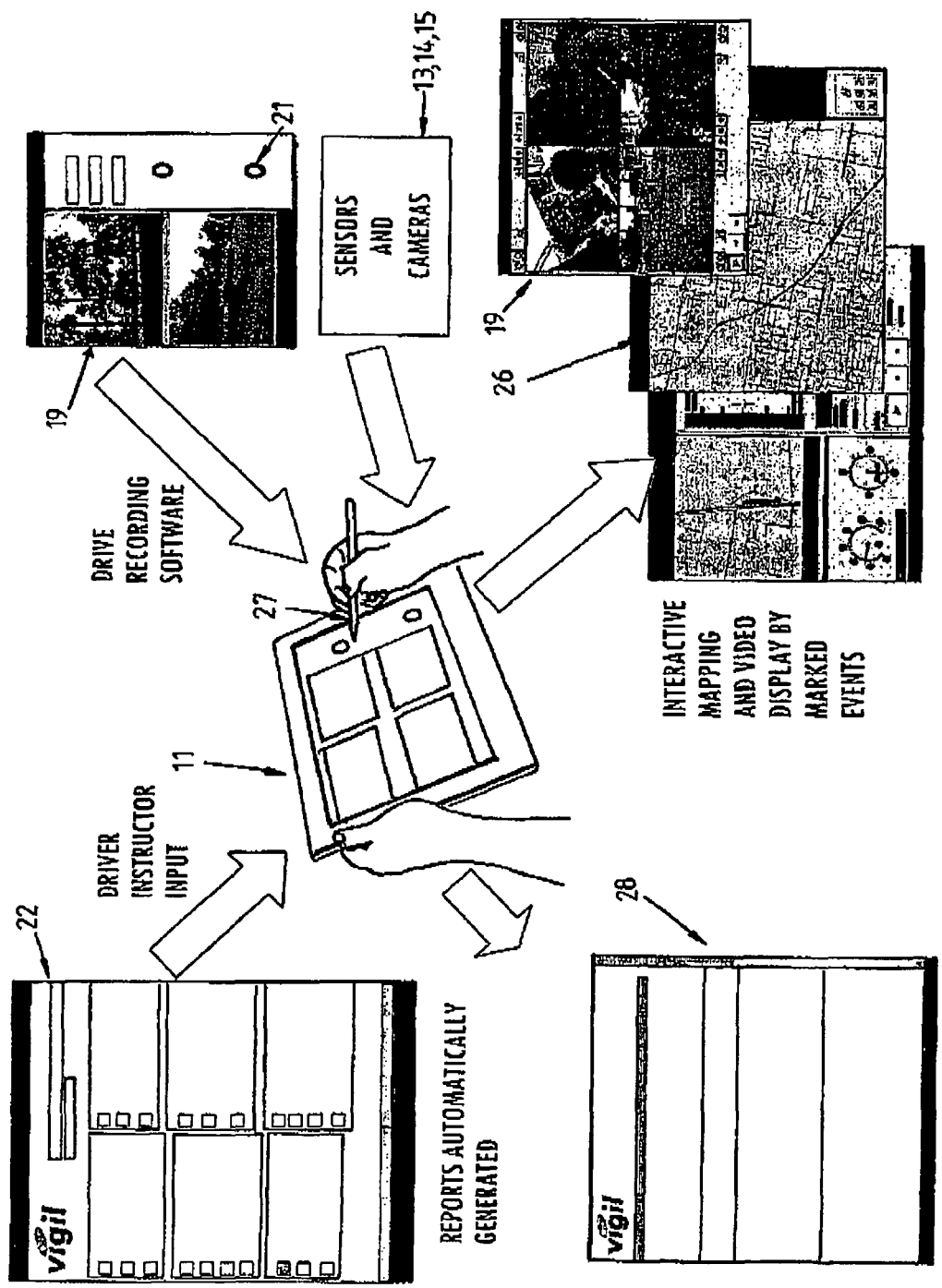
FIG. 3 illustrates schematically the manner in which the apparatus of the invention is used in relation to vehicle driver training or testing.

The apparatus 10 is used within a suitable training vehicle for example a bus and the video cameras 13 are mounted on the vehicle to record different views from the vehicle such as views to the front and rear of the vehicle and/or a view or views of a vehicle driver. The location of a vehicle in addition is monitored by the GPS sensor 14 also mounted on or within the vehicle. The computer 11 is programmed with driver recording software to enable the computer display screen 12 to show in a video window, the view or views 19 from the one or more video cameras 13. The display screen 12 also can display as shown in FIG. 3 route and location on a map display 20 and vehicle speed 21 derived from the GPS sensor 14 corresponding to the route being traveled by the vehicle and to the images captured by the video camera/s 13.

The computer 11 is also programmed to display a customizable input form 22 in this case a driver assessment form which enables input by a driver trainer or tester. The input form can be generated by a low-level wizard application supplied as part of the software, or by using a third-party form authoring application to create more in-depth forms.

A typical driver assessment form 22 is shown in FIG. 2 and includes in this case six assessment headings 23 or categories relating to operation of a vehicle in this case "Following Distance", "Turns", "Traffic lights and Signs", "Intersections", "Braking" and "Speed". Each heading or category is assessed in accordance with sub-headings which are indicative of the correct (or incorrect) operation of a vehicle. For example the sub-headings 24 under the "Following Distance" heading are "Uses proper stopping distance behind other vehicles", "Maintains safe following distance at city driving speeds", and "Proper following distance at freeway driving speeds". Input selection boxes 25 enable the driver trainer using the computer stylus or mouse to indicate whether the event defined by the sub-headings 24 has or has not occurred. In addition, the assessment form 20 has a text box 26 enabling freehand text and/or freehand diagrams to be entered by the driver trainer.

In use, the apparatus 10 is set up in a vehicle where a driver is to be assessed such as in a bus with the GPS sensor 14 positioned to provide sensed location and movement data to the computer 11 through the junction box 16. The cameras 13 are set up on the vehicle to capture required video signals which are supplied to the computer 11 which is typically held by a trainer or tester in the vehicle observing the operation of the vehicle by the driver. The video window on the computer display screen 12 can show the views 19 from two or more cameras 13 (see FIG. 3). A video preview window allows accurate setup of cameras view prior to driver training testing session. This window also includes a display of current speed 21 derived from the GPS.

During the driver training or testing session, the route and location of the vehicle is recorded for subsequent display on a map using a circuit overview menu whilst the entire journey is recorded by the cameras 13. The driver tester or trainer then can enter information into the assessment form 22 in accordance with operation of the vehicle by the driver. Thus if an event indicated in a sub heading for example a sub heading 24 has occurred, the trainer or tester uses the mouse or stylus 27 to select the relevant event box which will display the numeral "1" or any other indicator in the box.

GPS, video and other data is collected by the computer 11 while the driver tester/trainer is inputting the customised information. Each time an event is selected or input by the driver trainer, the location, video and speed at that time are recorded so that the event is linked to or synchronized with location information (as for example shown on a map 26) as well as video images 19 of or adjacent to that location.

In addition to entering data into a customised form 22, miscellaneous events may be recorded by using a free-form field such as in the box 26. This field allows the input of diagrams, text and symbols. Handwriting recognition software may be used to turn the notes into text.

After the data collection has been completed, the customised information entered into the form 20 is integrated with a database and may be viewed by time, location or by other customisable categories or standard or customized reporting tools. Using the information entered by the instructor/operator, the large video data files may then be sliced into smaller pieces, with irrelevant information being deleted. This decreases storage requirements. These smaller slices of the video/data files may then be integrated into the database. Automated tools/neural network style algorithms can be used to interrogate the database to facilitate the automated detection of driving events.

A typical driver assessment report 28 derived from a driver training or assessment session is illustrated in FIG. 4. The generated report shows the number of times certain instructor detected events have occurred, how this links to the sub-headings in the report and advice that should be adhered to reduce the risk of this behavior occurring again.

Optionally each type of event can be highlighted on a map of the drive undertaken on the report. This report is customizable from a database that stores this information and preferably can only be modified by a user with administrator privileges. The results of individual test drives and synchronized information regarding the completion of the training may be stored in corporate databases.

During debrief, the "jump to event" function will jump up to 30 seconds before a marked event. Events of interest can be selected for display by selecting that item on the pull down menu.

In the embodiment of the apparatus of the invention, the computer 11 used comprises a tablet PC however any other computing platform may be used such as a Laptop or Pocket PC or an in-car PC or customized PC either permanently or temporarily mounted. A portable computer however is preferred to allow portability of the apparatus.

Whilst the described embodiment uses inputs from up to four cameras 13, and a GPS sensor 14, the apparatus may also include other sensors to sense vehicle operation such as the inertial sensors 15 or following distance sensors, and ECU interfaces.

The present invention, by automating reporting functionality, improves the productivity of driver instructors as paperwork is eliminated. Initial experiments have shown up to 2 hours per day productivity improvement potential. By automated links to corporate databases, robustness of risk management and training processes is assured. Effectiveness of training is assured as interactive debriefing can provide a strong link between classroom training and on-road performance The link between skills required, observed performance and video images provides evidence for personal change. Personalized action plans are directly related to observed problems. Improved interaction between trainers and trainees also results. The apparatus is easy to transport, setup and install.

Whilst the invention has been described with reference to vehicle driver training and testing, it may be applied to many different applications where training or testing in the use of machinery or equipment is required, for pipeline and powerline auditing, road maintenance checking, minesite, refinery and powerplant safety documentation, homeland security documentation and audits, military base audits and pilot, marine captain training as well as efficiency audits for establishments such as factories, hotels or warehouses.

For auditing purposes, only two cameras may be necessary combined with a GPS sensor for sensing location and a computer such as a tablet PC. The cameras may be vehicle mounted and the vehicle driven around the establishment being audited with photographic and video images being recorded linked to GPS location information. Alternatively, the location information may be derived from a RF ID tag. Information is then input by the person undertaking the audit (in the same manner that information is inserted into the form 22) with that information being linked to the images and location. Assessments can then be undertaken of all the data for audit or any other purposes.

Referring now to FIGS. 5 to 12, there is illustrated an application of the information collection function of the above described apparatus for the purpose of creating a computer based training program for training vehicle drivers in relation to particular routes which a driver may be required to undertake for example a route to be traversed by a bus driven by the driver so that the driver can be trained in relation to the route. The computer based route training system of this embodiment however may be applied to a wide range of applications where a person is to be trained or informed in relation to a particular route. For example persons may be required to be trained in relation to the transportation of dangerous goods along a particular route. Similarly military personnel may be required to be trained in relation to the transportation of military equipment along a route. The general public however may also require information in relation to a particular route to be undertaken. The description below is primarily related to the training of bus drivers however it will be appreciate that the system may be equally applied to other applications as referred to above.

Figure 5:
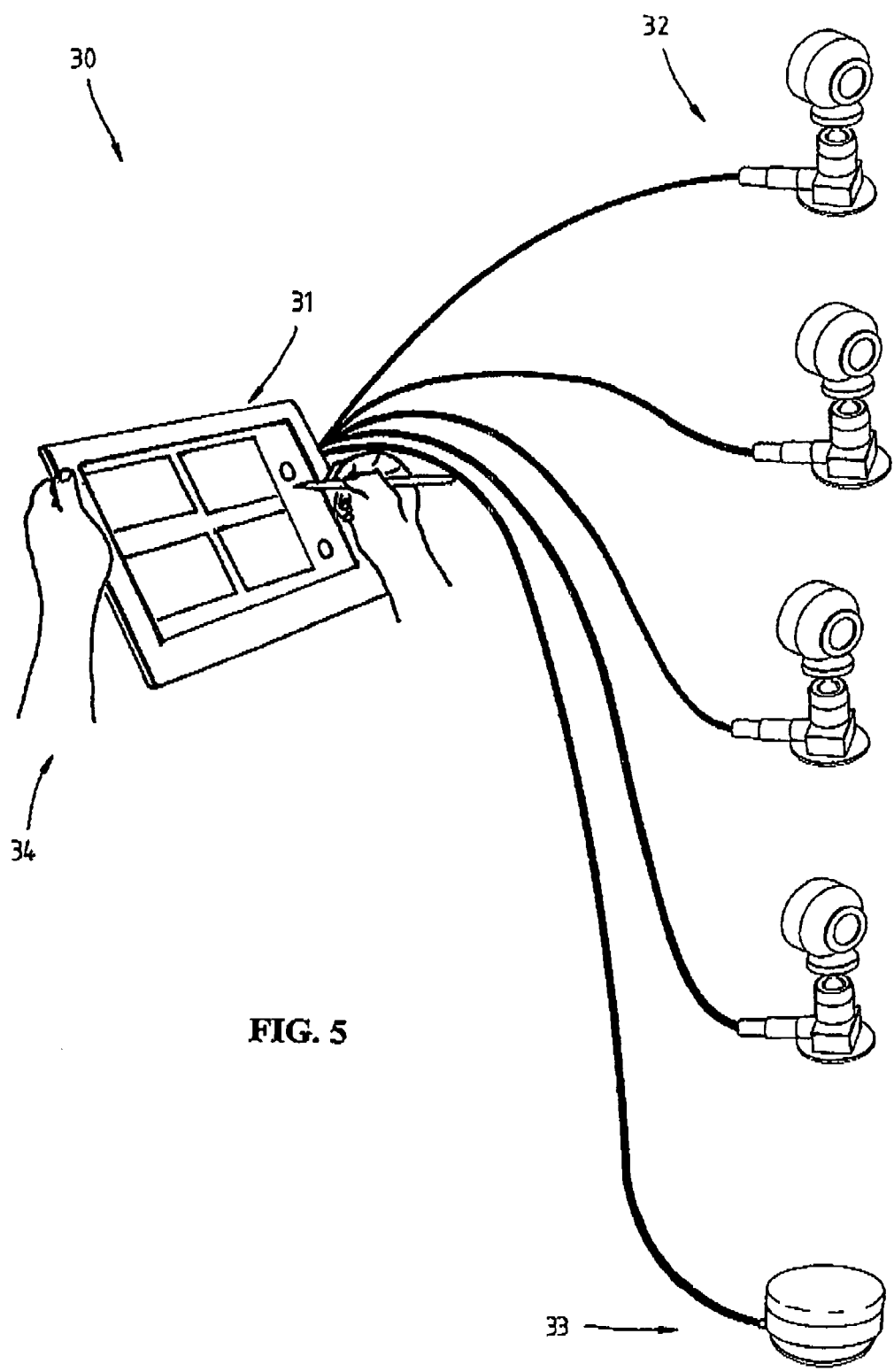
FIG. 5 illustrates apparatus for preparing a route training program according to another aspect of the invention.

The computer based training system 30 shown schematically in FIG. 5 uses a computer 31 such as a laptop computer or a tablet computer which is software programmed to have a first recording administration/trainer mode and a second student/trainee mode. In the first mode, the administrator/trainer initially records video and locating information whilst traveling in a vehicle traveling along the route for which the training program is to be created. For the purpose of recording the route, one or more image capturing means or cameras 32 are mounted to the vehicle, the image capturing means or cameras 32 being provided with quick-release vehicle mounting hardware to enable them to be readily mounted to the vehicle. The image capturing means in this embodiment comprise two to four CCD cameras which capture images at 10 frames per second at ¼ VGA resolution. The cameras 32 also have day and night capability and may have wide-angle and telephoto options. Images captured by the cameras 32 are stored in the memory of the computer 30 as the vehicle travels along the route.

Figure 6:
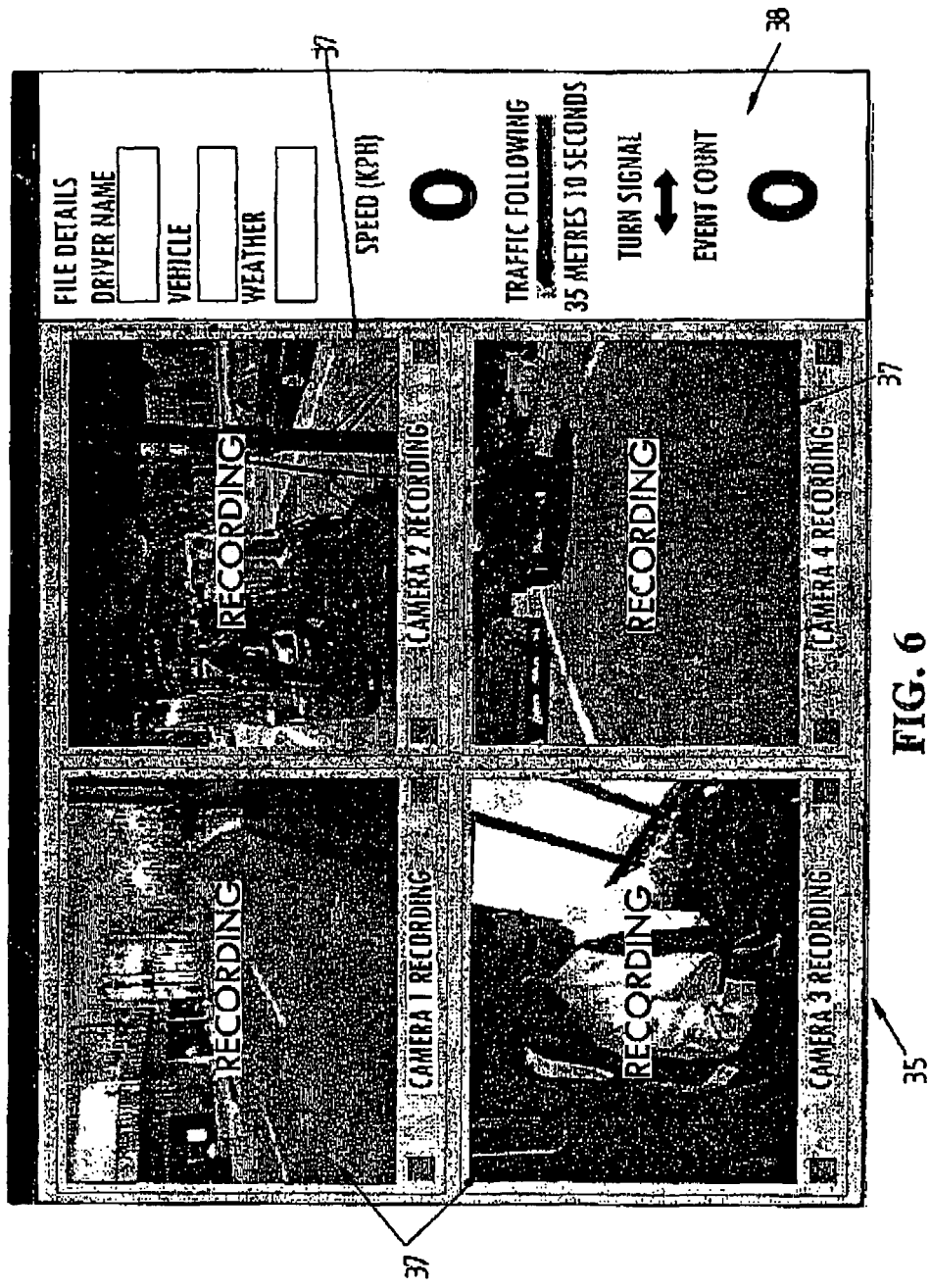
FIG. 6 illustrates a typical preview screen display on a computer for use in preparing the route training program.

Additionally, as the vehicle is traveling along the route, location data is captured in the computer 30 from a GPS sensor 33 which in the illustrated embodiment may comprise Wide Area Augmentation System (WAAS) or a differential GPS system. The GPS sensor 33 used provides location information once per second at a 2-5 m accuracy. Data obtained from the GPS sensor 33 can be displayed on a map so that the position of the vehicle along a particular route can be viewed on a map display. A mapping interface is used to allow the importation of any data in standard GIS format and display it on the display screen. A user-customisable map display can include road styles, parkland, water and other features. Maps of this type are known and can be accessed free or from commercial mapping suppliers FIG. 6 illustrates a typical screen display 35 of the computer 31 as generated by the recording software using four cameras with images 37 from each camera being displayed during recording of the route. As shown, the images are different view from the vehicle comprising clockwise from the top image 37, a view of the adjacent vehicle lane views to the front and rear of the vehicle and a view of the driver. The screen display 35 also includes a display 38 of speed. This display is similar to the display used in the embodiment of FIG. 3. The typical file size of the file storing this information is 400 MBytes per hour.

Figure 7:
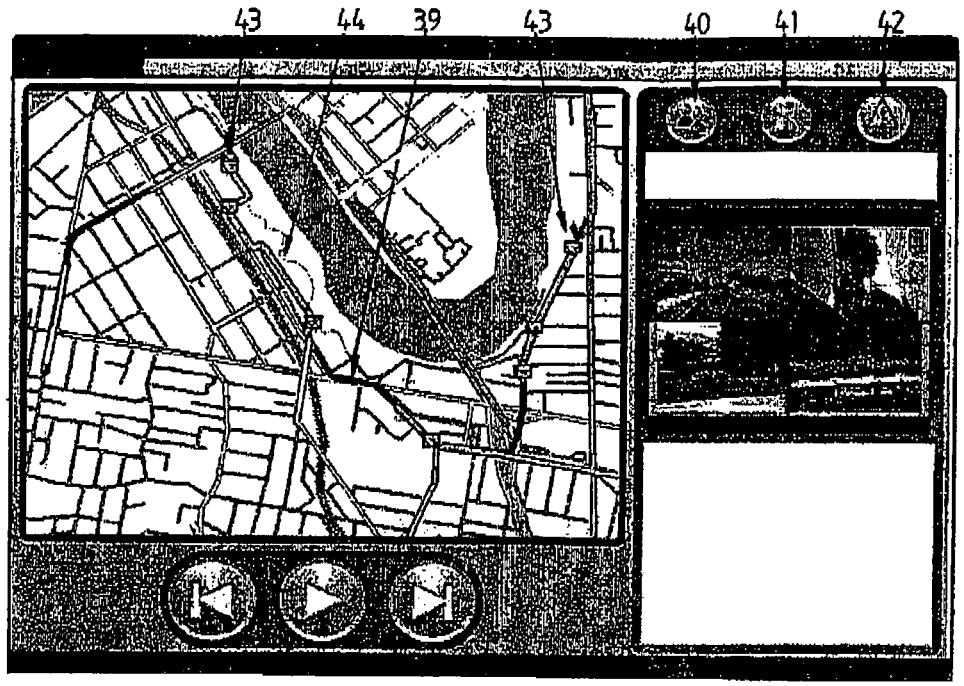
FIGS. 7 and 8 illustrate typical authoring screen displays for use in preparing the route program with the of a route marked with "hotspots" and "hotzones"
Figure 8:
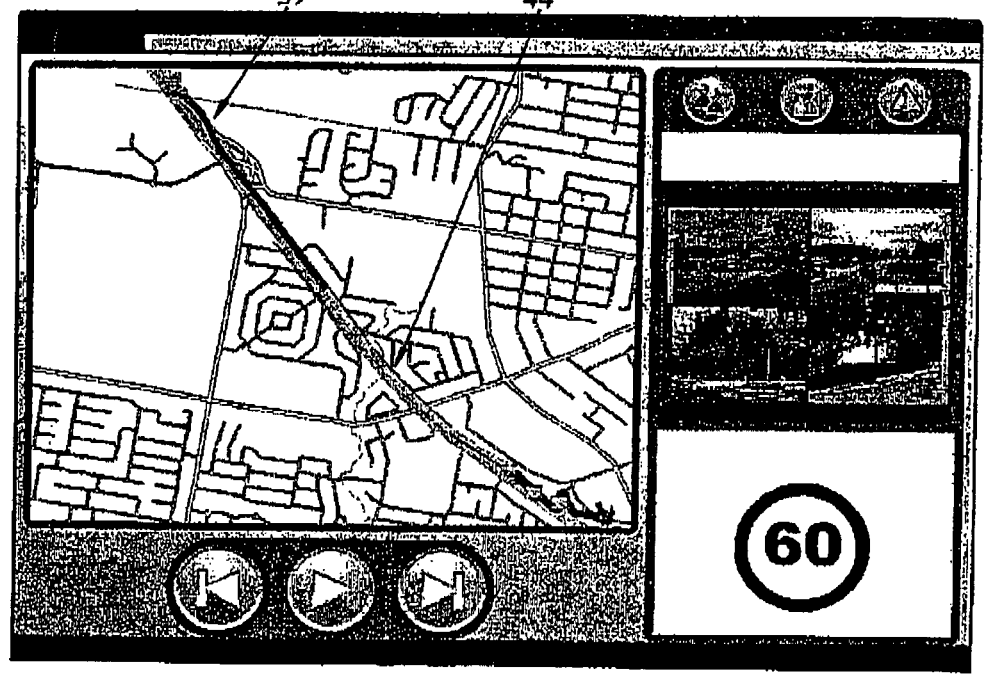

During the recording mode, the administrator/trainer 34 can insert information relating to the route by operation of an event button. In addition, the administrator/trainer 34 can record with a microphone verbal notes which can be used as reminders for later preparation of the training program. The administrator/trainer 34 by using an authoring tool or screen, examples of which are illustrated in FIGS. 7 and 8 can mark the route 39 in relation to which training is to be undertaking and can also mark different points of interest or zone of interest on the route which have important information attached to them. These points referred to herein as "hotspots" and "hotzones" respectively are defined to focus trainees only on sections of the route or important points along the route 39 that are required learning. Hotspots can be classified into one or more pre-defined categories for quick browsing. For example, hotspot types may be locations of traffic issues, accident black spots, significant customer service issues, bathroom locations, and rest stop locations during layovers between runs. In the authoring tools or screens illustrated in FIGS. 7 and 8, the categories which relate to a bus route are defined by icons 40, 41 and 42 which are customer issues, conductor issues and safety issues respectively.

After recording of all of the above information whilst traveling the route, the administrator/trainer can open the file and manage the hotspots and hotzones by inserting information relating to each hotspot. In the authorizing screen of FIGS. 7 and 8, various hotspots 43 along the route have been identified by icons. Different types of hotspots can be made by the trainer/trainer to appear as different icons or colours on the map. Thus the icons 43 may be one or more of the icons 40, 41 and 42 referred to above. Hotzones 44 along the route 39 can be marked in different colours.

Figure 9:
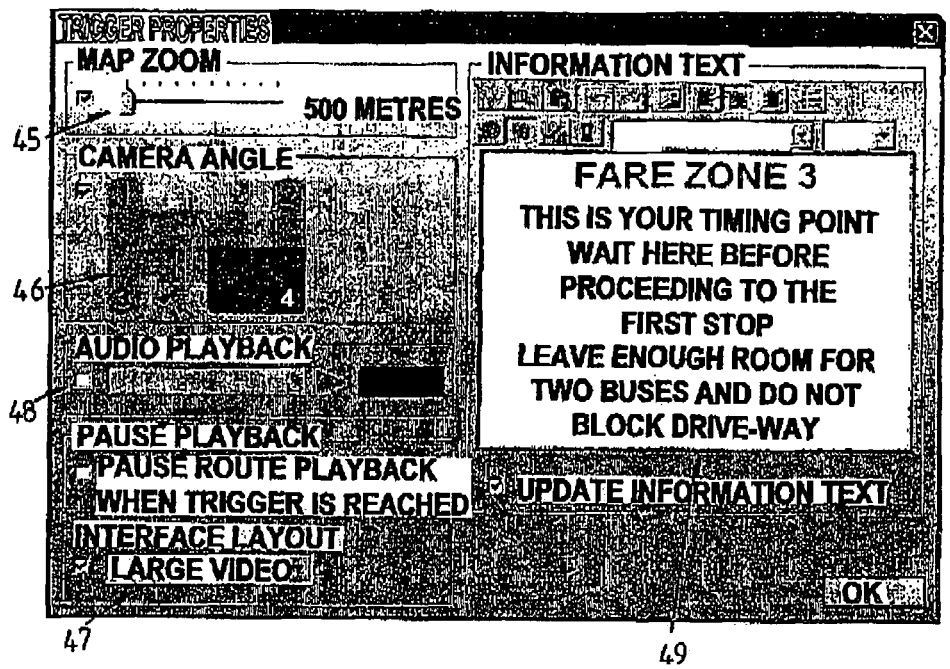
FIGS. 9 and 10 illustrate alternative screen displays for defining "hotspots" and "hotzones" along the route.

By positioning the cursor on a hotspot or hotzone and clicking, a pop-up window is triggered and appears as in FIG. 9 which allows the administrator/trainer to enter any text information as required. The pop-up window alternatively can be overlaid on the route creating authoring screen as in FIG. 10.

Within the trigger window, the administrators/trainers can adjust the map zoom to displayed of the hotspot or hotzone. The administrator/trainer can also determine within the trigger window whether to include a video as recorded by the cameras 32 for playback by marking the appropriate box 47 within the pop-up window. The administrator/trainer can determine the duration, start and finish of the video. The administrator/trainer can also determine whether to include playback of audio by marking the box 48. The box 49 allows the administrator/trainer to add a text message relating to the hotspot or a warning such as the speed limit warning in the trigger window shown in FIG. 10.

The trigger widows thus trigger the display of certain information at specific times determined by the properties defined in the trigger. Triggers allow trainer control of map zoom, video angle (1-4 cameras), audio play in any Windows audio format display of information in a rich text box including symbols and images.

The administrator/trainer in preparing the program can add a new event or hotspot or hotzone or remove an unnecessary event or hotspot or hotzone. A training program can include one or many hotspots or hotzone on a route without limit. Hotspots or hotzones can be from one second to the entire route length. The administrator/trainer can also show a single camera view and determine the size of the camera view window.

Figure 10:
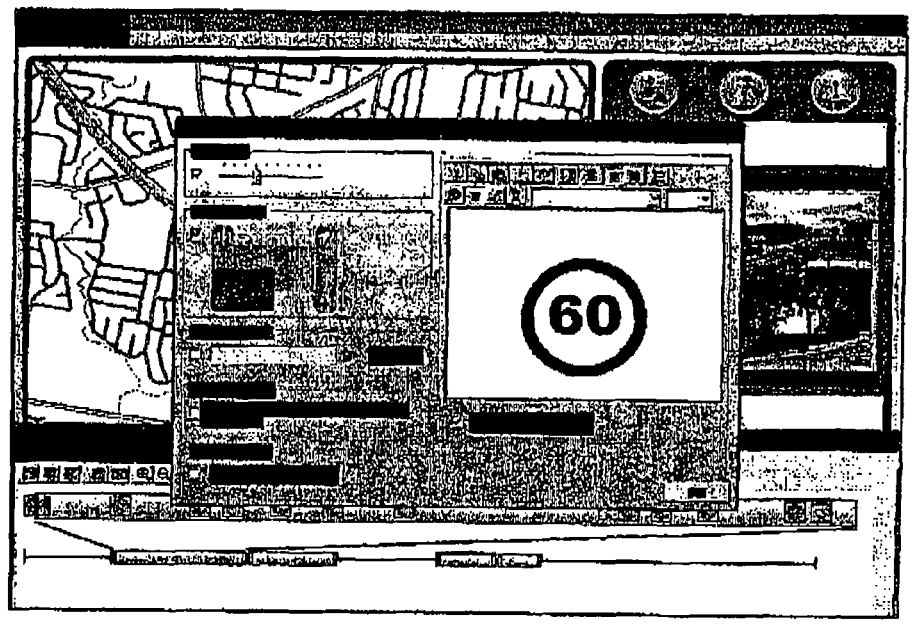

The windows shown in FIGS. 9 and 10 allows the display of a map together with a video display. In this case hotspots are visualized on the map as a different icons and hotzones as different color regions and on a timeline as block of time. A zoom ability can give finer visualisation of the sequence of events in a hotspot or hotzone. The author however has full dynamic control of map viewing for different parts of the route—zoom, pan, etc.

For video and audio purposes, scripted control of camera angle from one to four cameras at trigger points in the route is provided. Video is synchronized to map location and timeline for easy navigation to points of interest. Other video can be embedded in computer based training window in place of the map. Audio can be played at trigger points or embedded in the training program.

Figure 11:
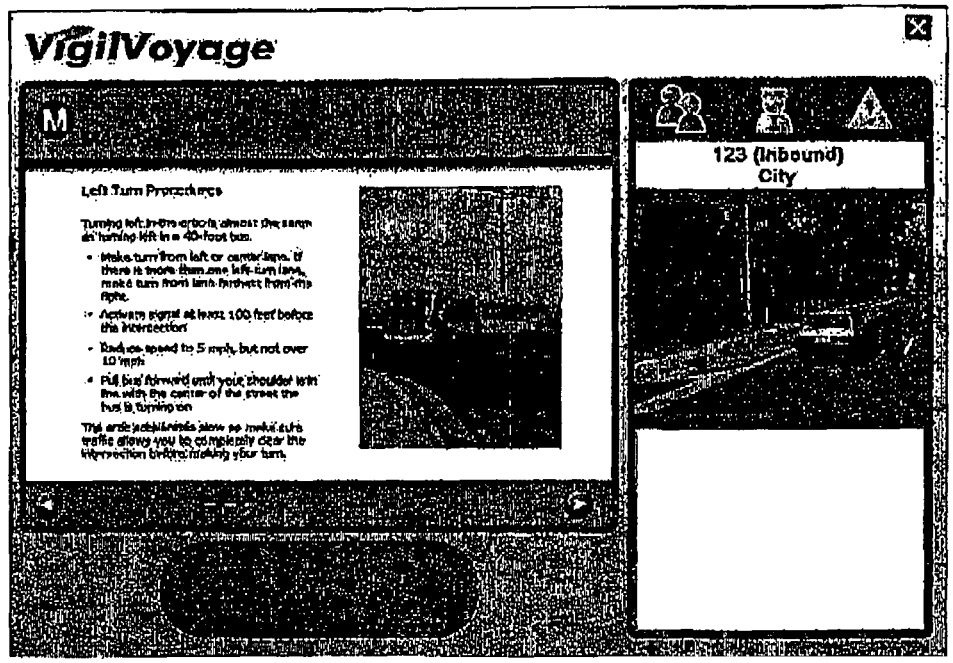
FIG. 11 illustrates a presentation window as used during route training.

Instead of the map display as illustrated in FIGS. 9 and 10, a presentation window for presentation to the trainee as illustrated in FIG. 11 can replace a mapping window at pre-defined points, in hotspots.

The computer based training program prepared as above can contain any content within HTML specification. It may include video, sound, Flash animation, text, Powerpoint® slides. It may include HTML-based quizzes. It may support Lectora® and other multimedia authoring software packages with Web publishing capability. It further may refer to external documents of any type, including Microsoft Word® documents, Microsoft Excel® spreadsheets, and Adobe® PDFs. It further may play audio files, such as WAVs, MP3s or WMAs and additionally may display image files, such as JPEGs, GIFs, and BMPs. The program may describe in detail a route of up to two hours in length and may draw a map of the route with the ability to zoom and pan automatically.

At the completion of authoring process as described above, the program is saved in a suitable file format and is published for student or trainee access such as over a network.

Figure 12:
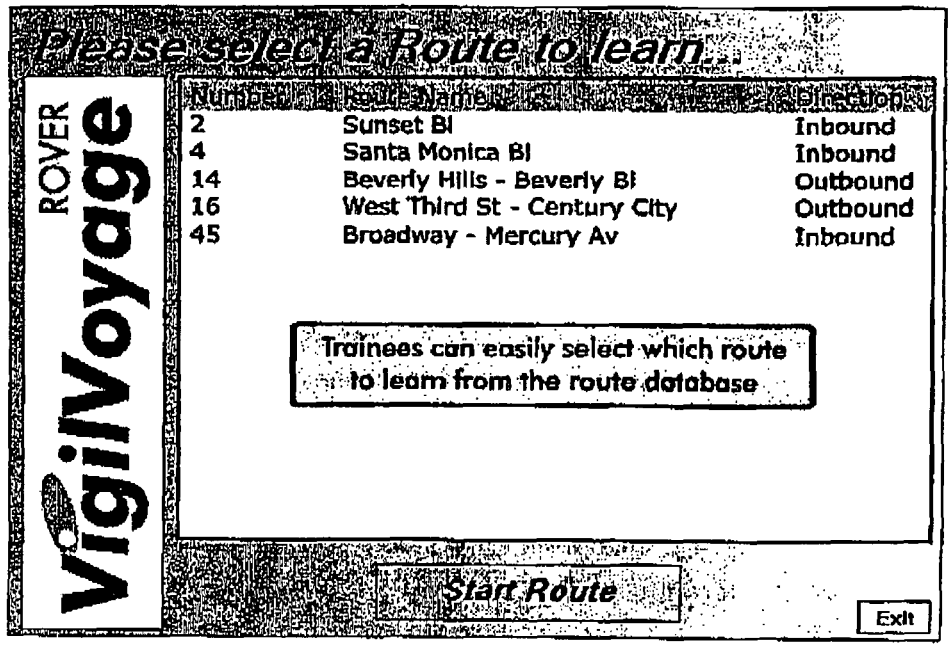
FIG. 12 illustrates a typical screen display for selection of a route for route training.

For use of the computer based training program, a trainee is presented with a list of available routes to learn and the trainee selects which route they need to learn as presented on the screen display illustrated in FIG. 12. A multimedia introduction to the route can be played which may include standard materials for all routes, or the particular issues that make the selected route different from others. Alternatively, an overview of the entire route complete with all hotspots is displayed. The trainee can be taken to the first hotspot skipping parts of the route that are irrelevant. The first hotspot will often be the "deadhead", the journey from the depot to the start of the route as in FIG. 8. The trainee by clicking on a hotspot will be shown a display as determined by an administrator. Thus a defined video may be played, text notes will be displayed and any link to an external program will be activated by clicking the relevant button. As the hotspot is processed, map zooms change to show more detail, camera angles change to show the best view of points of interest or caution, and cautionary and advisory text and graphics appear (for example changes in speed zones) in the text box as hotspots are processed by the system. Each hotspot visited by the student will change colour or otherwise be marked so that a track can be kept of the visited hotspots. The trainee can thus be focused on the important aspects of the route to be learned.

As presentations are reached, the program hands total control to the content that appears to replace the map. Familiar presentations reinforce in a practical manner the classroom training received on topics such as turns, railroad crossings, schools, entering and leaving premises, loading docks, etc.

The trainee may be presented with quiz materials during the presentation, if these have been authored using SCORM compliant tools, then results can be communicated back to learning management systems When the trainee has completed learning the route, they are returned to the route menu. Routes may be structured to allow "branching" from the main route to minor route for example similar to a branch line on a railway. Certain conditions may require this branching functionality.

Routes may be assembled from existing sub-components or segments of routes. For example a new bus route may be composed 50% of an existing bus route and 50% of a new route.

Thus a route may be broken up into individual route segments which may be prepared in the above described manner using cameras 32, a GPS sensor 33 and input from an administrator/author 34. The segments may be prepared after recording the full route and broken up into different files or separate files for each segment may be prepared during the recording process. Each route segment thus contains video images and location information and may additionally contain "hotspot" and/or "hotzone" information input by the administrator/author.

If there are amendments to a route segment such as a new roundabout, only that a particular route segment will be required to be changed or amended.

To view a required route, the appropriate route segments which constitute that route can be played back in the correct order with the route segments being combined similar to the task of editing a movie made up of scenes to define the whole route.

Where different routes have some overlap, overlapping route segments are thus only required to be recorded once. A user may then, in seeking driving directions or information for a particular route, search the database and receive information and directions relating to the particular route assembled from a plurality of route segment files which make up that route. The driver is thus presented with video images, location data (as indicated on a map) and where relevant "hotspot" or "hotzone" information along the route.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as herein described.

The invention claimed is:

1. Mobile equipment operator assessment apparatus for collecting information relating to at least one observable scene during assessment of an operator of mobile equipment, said apparatus comprising
   computing apparatus,
   location sensing means operative to provide plural location data on a continuous basis as the mobile equipment moves, each location datum corresponding to a different one of plural locations of the mobile equipment,
   image capturing means operative to capture at least one image of said observable scene or scenes as the mobile equipment moves,
   input means configured and operative to receive external input of observation information relating to said observable scene or scenes and to operation of the mobile equipment by the operator, the observation information being received from an observer on an intermittent basis as the mobile equipment moves such that the observation information is received at fewer than all of the plural locations of the mobile equipment corresponding to the plural location data
   storage means operative to store in said computing apparatus each of plural location data, image data relating to said at least one captured image and the received intermittent observation information with respective synchronisation data, the received intermittent observation information being stored with its synchronisation data in a different data structure to the location and image data and their synchronisation data to thereby provide for synchronisation of each of image data and observation information with location data upon retrieval of image data, observation information and location data from the storage means.

2. Apparatus as claimed in claim 1 wherein said image capturing means and location sensing means are located in or on a vehicle from which image and location data are captured and recorded.

3. Apparatus as claimed in claim 1 wherein said computing apparatus includes image display means adapted to display a table or form into which observation information may be inserted using said input means for storage in said table or form.

4. Apparatus as claimed in claim 1 wherein said input means comprises one or more of a stylus, touch screen, computer mouse, trackball, smart pen, keyboard, keypad, a microphone associated with voice recognition software, an interactive entertainment input device, a game pad or a joystick.

5. Apparatus as claimed in claim 1 wherein said image data comprises at least one of video image data and still image data captured using one or more of a camera, a video recorder, a web cam, a separately recorded camcorder video, a PDA camera, at least one of time and location stamped still camera, or cell phone camera.

6. Apparatus as claimed in claim 1 wherein said location data comprises geographical data derived from one or more of a GPS positioning system, European Satellite Navigation System (GALILEO), Russian Global Navigation Satellite System (GLONASS), radio beacon based location technologies (802.11, Bluetooth, GSM), micro-location sensors or from an RF ID tag.

7. Apparatus as claimed in claim 1 operative to link the location data electronically to the recorded image data by way of the synchronisation data to thereby provide for synchronisation of the location data with the recorded image data upon its retrieval from the storage means.

8. Apparatus as claimed in claim 1 operative to multiplex the location data and the image data into an audio stream of at least one media file using a real time multiplexing algorithm.

9. Apparatus as claimed in claim 1 wherein said computing apparatus includes means for analysing said image data, location data and observation information and for providing one or more reports relating to operation of said equipment by the operator based on the image and location data and observation information.

10. Apparatus as claimed in claim 2 and used for assessing a driver of a motor vehicle during operation of said vehicle by said driver and wherein said observable scene or scenes comprise views of at least one of said driver and views from said vehicle, said image capturing means being adapted to capture image data relating to operation of said vehicle by said driver, said location sensing means being adapted to obtain location data of said vehicle, and wherein said input means is adapted to receive input of information from an observer during and relating to operation of said vehicle by said driver.

11. Apparatus as claimed in claim 10 wherein said computing apparatus includes means for analysing said data and for providing one or more reports relating to operation of the vehicle by said driver based on said data.

12. Apparatus as claimed in claim 10 wherein said image data comprises captured image data as recorded by one or more video cameras showing a particular vehicle route travelling by at least one of a vehicle and the vehicle operator and wherein said location data is derived from a GPS sensor used to sense geographical location of the vehicle.

13. Apparatus as claimed in claim 10 and including means for monitoring and recording further data relating to operational parameters of a vehicle, said monitored vehicle parameters comprise one or more of the following:
   Pattern Recognition (position of the vehicle on a road or within a lane on a road),
   Object Tracking (at least one of distance, direction and orientation in relation to other vehicles),
   Vehicle inertia (to measure vehicle linear and angular acceleration, deceleration and vehicle body movement as in cornering and stopping),
   Gas pedal use,
   Brake use,
   Turn signal use,
   Gearbox use,
   Engine RPM,
   Fuel use,
   Driver face/eye movement.

14. Apparatus as claimed in claim 10 wherein said information provided by the observer is input under predetermined categories into the computing apparatus on a displayed form or table, said predetermined categories relating to at least one of the vehicle operation and the vehicle driver.

15. A method of assessing an operator of mobile equipment in which information relating to at least one observable scene is collected during mobile equipment operator assessment, said method comprising the steps of:

receiving plural location data on a continuous basis as the mobile equipment moves, each location datum corresponding to a different one of plural locations of the mobile equipment, capturing image data relating to said scene or scenes as the mobile equipment moves, receiving by way of input means external observation information relating to the at least one observable scene and to operation of the mobile equipment by the operator, the observation information being received from an observer on an intermittent basis as the mobile equipment moves such that the observation information is received at fewer than all of the plural locations of the mobile equipment corresponding to the plural location data, and storing in computing apparatus each of the plural location data, the image data and the intermittent observation information with respective synchronisation data, the received intermittent observation information being stored with its synchronisation data in a different data structure to the location and image data and their synchronisation data to thereby provide for synchronisation of each of image data and observation information with location data upon retrieval of image data, observation information and location data from the storage means.

16. A method as claimed in claim 15 and used for assessing a driver of a motor vehicle during operation of said vehicle by said driver, said observable scene or scenes comprising views of at least one of said driver and views from said vehicle and wherein said image data and location data relate to operation of said vehicle by said driver.

17. A method as claimed in claim 15 further comprising analysing the image and location data and observation information and providing a report or reports of operation of said mobile equipment by said operator based on said analysed data.

18. Apparatus for preparing a computer-based route training or identification program in relation to a route to be undertaken by an operator of mobile equipment, said apparatus comprising
   computing apparatus,
   location sensing means operative to provide plural location data on a continuous basis as the mobile equipment moves, each location datum corresponding to a different one of plural locations of the mobile equipment,
   image capturing means operative to capture image data relating to said route as the mobile equipment moves,
   and input means associated with said computing apparatus configured to receive external input of observation information from an observer on an intermittent basis as the mobile equipment moves such that the observation information is received at fewer than all of the plural locations of the mobile equipment corresponding to the plural location data, the received observation information relating to said route and to operation of the mobile equipment by an operator,
   the computing apparatus being adapted to receive and store each of the plural location data, the image data and the intermittent observation information with respective synchronisation data, the observation information being stored with its synchronisation data in a different data structure to the location and image data and their synchronisation data to thereby provide for synchronisation of each of image data and observation information with location data upon retrieval of image data, observation information and location data from the storage means during compilation of a computer-based training program based on said data and information.

19. Apparatus as claimed in claim 18 and including means for capturing and recording further data relating to the mobile equipment, said further data comprising one or more of data from engine interfaces, following distance sensors and inertial sensors.

20. Apparatus as claimed in claim 18 and including means for displaying said image data and location data on a map on a display screen of said computing apparatus.

21. Mobile equipment operator assessment apparatus according to claim 1 in which the storage means is operative to store the observation information with synchronisation data in a first file and to store location data and image data with their synchronisation data in at least one second file.

22. Mobile equipment operator assessment apparatus according to claim 1 in which the synchronisation data comprises timing data.

* * * * *